(12) United States Patent
Tsutsui et al.

(10) Patent No.: US 6,510,968 B2
(45) Date of Patent: Jan. 28, 2003

(54) PRESSURE RELIEF VALVE FOR AN INHALATOR

(75) Inventors: Tatsuo Tsutsui, Kanagawa (JP); Akira Yanagawa, Yokohama (JP)

(73) Assignees: Unisia Jecs Corporation, Atsugi (JP); Dott Limited Company, Yokohama (JP)

( * ) Notice: Subject to any disclaimer, the term of this patent is extended or adjusted under 35 U.S.C. 154(b) by 0 days.

(21) Appl. No.: 09/889,216

(22) PCT Filed: Dec. 14, 2000

(86) PCT No.: PCT/JP00/08868

§ 371 (c)(1),
(2), (4) Date: Jul. 12, 2001

(87) PCT Pub. No.: WO01/44701

PCT Pub. Date: Jun. 21, 2001

(65) Prior Publication Data

US 2002/0158087 A1 Oct. 31, 2002

(30) Foreign Application Priority Data

Dec. 17, 1999 (JP) ............................................ 11-358661

(51) Int. Cl.⁷ ................................................. B65D 83/14
(52) U.S. Cl. ................................................. 222/402.1
(58) Field of Search ............................. 222/396, 402.1, 222/402.2, 402.22, 402.24, 402.25, 635; 128/200.23, 205.24

(56) References Cited

U.S. PATENT DOCUMENTS

| 2,744,665 | A |   | 5/1956  | Carlson et al. ............. 222/394  |
| 5,915,598 | A | * | 6/1999  | Yazawa et al. ........... 222/402.1   |
| 6,036,942 | A | * | 3/2000  | Alband ..................... 222/402.1 |
| 6,089,256 | A |   | 7/2000  | Warby ......................... 137/375 |
| 6,095,182 | A |   | 8/2000  | Warby ......................... 137/375 |
| 6,129,247 | A | * | 10/2000 | Thomas et al. ......... 222/402.24    |
| 6,131,777 | A | * | 10/2000 | Warby ..................... 222/402.2  |

FOREIGN PATENT DOCUMENTS

| CH |      453 238 | 6/1968  |
| DE |    198 35 273 | 3/1999  |
| DE |    298 23 474 | 9/1999  |
| FR |      1145605 | 10/1957 |
| JP |     8-141450 | 6/1996  |
| WO |  WO 99/48773 | 9/1999  |

* cited by examiner

*Primary Examiner*—Lesley D. Morris
*Assistant Examiner*—Stephanie L Willatt
(74) *Attorney, Agent, or Firm*—Foley & Lardner

(57) ABSTRACT

A gas ejection valve includes a valve casing including first and second blocks that cooperate to define a holder groove and have a first mating face formed with an annular space, an inner peripheral seal ring disposed on the inner periphery of the valve casing to be in close contact with the outer periphery of a valve pin and being received in the holder groove, and an auxiliary seal ring received in the annular space for preventing communication between the inside of the gas container and the holder groove.

20 Claims, 3 Drawing Sheets

PRESSURE RELIEF VALVE FOR AN INHALATOR

BACKGROUND OF THE INVENTION

1. Field of the Invention

The present invention relates to a gas ejection valve for ejecting contents filled in a gas container through a propellant or high-pressure gas such as liquefied $CO_2$ gas. More particularly, the present invention relates to an improved gas ejection valve that is free from leakage of gas with time.

2. Description of the Related Art

There have been used apparatus for ejecting by means of the gas pressure contents such as chemical agent filled, together with high-pressure gas, in a gas container through a gas ejection valve secured to an opening of the gas container. Such ejection apparatus have adopted Freon (CFC) as a propellant, but currently tend to use Freon substitute (for example, HFC134a) in place of Freon as a result of the rise of interest in environmental protection.

Although Freon substitute has no influence on the ozone layer, it causes global warming more than 1,000 times as much as $CO_2$. It is thus predicted that a future increase in its usage may raise a new problem. Therefore, in these days, it is considered to adopt, as a propellant for ejection apparatus, $CO_2$ gas, nitrogen gas, or inert gas such as helium, neon, krypton, xenon or radon that causes less destruction of the ozone layer and influence on global warming.

When using one of the above gases as a propellant for ejection apparatus, it is desirable to reduce the size of a gas container by liquefaction of gas as is carried out for currently-used Freon. For example, the vapor pressure of liquefied $CO_2$ gas is 60 $Kgf/cm^2$ at 20° C. Similarly, inert gas is preferably highly compressed or liquefied to achieve increased volume efficiency, the desirable pressure of which is 50 $kgf/cm^2$ or more.

A gas ejection valve applied for such high-pressure gases is disclosed, for example, in JP-A 8-141450. This gas ejection valve comprises a valve casing secured to an opening of a gas container, and a valve pin protrudably held by the valve casing for opening and closing a gas passage through operation from the outside of the gas container. The valve pin has a large-diameter portion that is in close contact with an inner peripheral seal ring arranged in the valve casing, and a small-diameter portion that protrudes upward from the large-diameter portion via a tapered portion. In the steady state with the valve pin being not pushed down, the gas passage is held closed by the large-diameter portion coming in close contact with the inner peripheral seal ring.

The gas ejection valve is configured as described above, so that when an end of the valve pin is pushed from the outside of the gas container, the small-diameter portion is moved to a position of the inner peripheral seal ring where the large-diameter portion has been placed, producing a clearance between the inner peripheral seal ring and the valve pin to open the gas passage. This causes contents in the gas container to eject outside together with gas.

When applied, for example, to ejection containers for chemical agents for medical application, the gas ejection valve should be reduced in size, which requires the inner peripheral seal ring of several millimeters in diameter. It is thus practically difficult to accurately form a holder groove of the valve casing for receiving the inner peripheral seal ring by machining a single block of the valve casing. For this reason, the valve casing is conventionally composed of a plurality of blocks, which are machined separately and then assembled to form the holder groove.

Specifically, the first block placed on the outer peripheral side of the gas container is formed with a concave, with which the second block placed on the inner peripheral side of the gas container is engaged axially. An inner peripheral corner of the second block is cut annularly to form the holder groove between the first and second blocks. Specifically, the second block has an L-shaped section recess, two sides of which define a bottom wall and one side wall of the holder groove. An inner peripheral edge of the lower surface of the first block defines another side wall of the holder groove.

With the above gas ejection valve, however, since the holder groove for receiving the inner peripheral seal ring is defined by the plurality of blocks, high-pressure gas in the gas container acts not only on the inner periphery of the inner peripheral seal ring along the valve pin directly, but on the outer periphery of the inner peripheral seal ring through a mating face of the blocks. As a consequence, the inner peripheral seal ring is greatly deformed by the synergism of the gas pressures resulting from the two paths, resulting in potential slight leakage of gas in the gas container to the outside through the inner peripheral seal ring.

Particularly, when using high-pressure gas with higher permeability such as liquefied $CO_2$ gas as a propellant, leakage of gas through the inner peripheral seal ring can be greater in consequence of long-term preservation, resulting in inconveniences such as undesired increase in concentration of contents ejected from the gas container and decrease in the longevity of the ejection apparatus.

SUMMARY OF THE INVENTION

It is, therefore, an object of the present invention to provide a gas ejection valve that is free from leakage of gas through a seal ring, and contributes to stable concentration of contents ejected from the gas container and increased longevity of the ejection apparatus.

The present invention generally provides a valve for a gas ejection apparatus with a container, comprising:

a casing secured to an opening of the container, the casing comprising first and second blocks that cooperate to define a first groove and have a first mating face formed with a space;

a pin movably held by the casing, the pin having a passage;

a first seal ring disposed on an inner periphery of the casing, the first seal ring being in close contact with an outer periphery of the pin, the first seal ring being received in the first groove, wherein when the pin is pushed down, the passage ensures fluid communication between an outside of the container and a portion of the casing closer to an inside of the container than the first seal ring; and a second seal ring received in the space, the second seal ring preventing fluid communication between the inside of the container and the first groove.

One aspect of the present invention is to provide an apparatus for ejecting gas, comprising:

a container with an imaginary axis; and a valve hermetically mounted to the container, the valve comprising:

a casing secured to an opening of the container, the casing comprising first and second blocks that cooperate to define a first groove and have a first mating face formed with a space;

a pin movably held by the casing, the pin having a passage;

a first seal ring disposed on an inner periphery of the casing, the first seal ring being in close contact with an outer periphery of the pin, the first seal ring being received in the first groove, wherein when the pin is pushed down, the passage ensures fluid communication between an outside of the container and a portion of the casing closer to an inside of the container than the first seal ring; and a second seal ring received in the space, the second seal ring preventing fluid communication between the inside of the container and the first groove.

Another aspect of the present invention is to provide a valve for a gas ejection apparatus with a container, comprising:

a casing secured to an opening of the container, the casing comprising first, second and third blocks, the first and second blocks cooperating to define a first groove and having a first mating face, the first and third blocks having a second mating face, the second and third blocks having a third mating face, the first, second and third mating faces being formed with a space;

a pin movably held by the casing, the pin having a passage;

a first seal ring disposed on an inner periphery of the casing, the first seal ring being in close contact with an outer periphery of the pin, the first seal ring being received in the first groove, wherein when the pin is pushed down, the passage ensures fluid communication between an outside of the container and a portion of the casing closer to an inside of the container than the first seal ring; and a second seal ring received in the space, the second seal ring preventing fluid communication between the inside of the container and the first groove.

The other objects and features of the present invention will become understood from the following description with reference to the accompanying drawings.

DETAILED DESCRIPTION OF THE INVENTION

Figure 1:
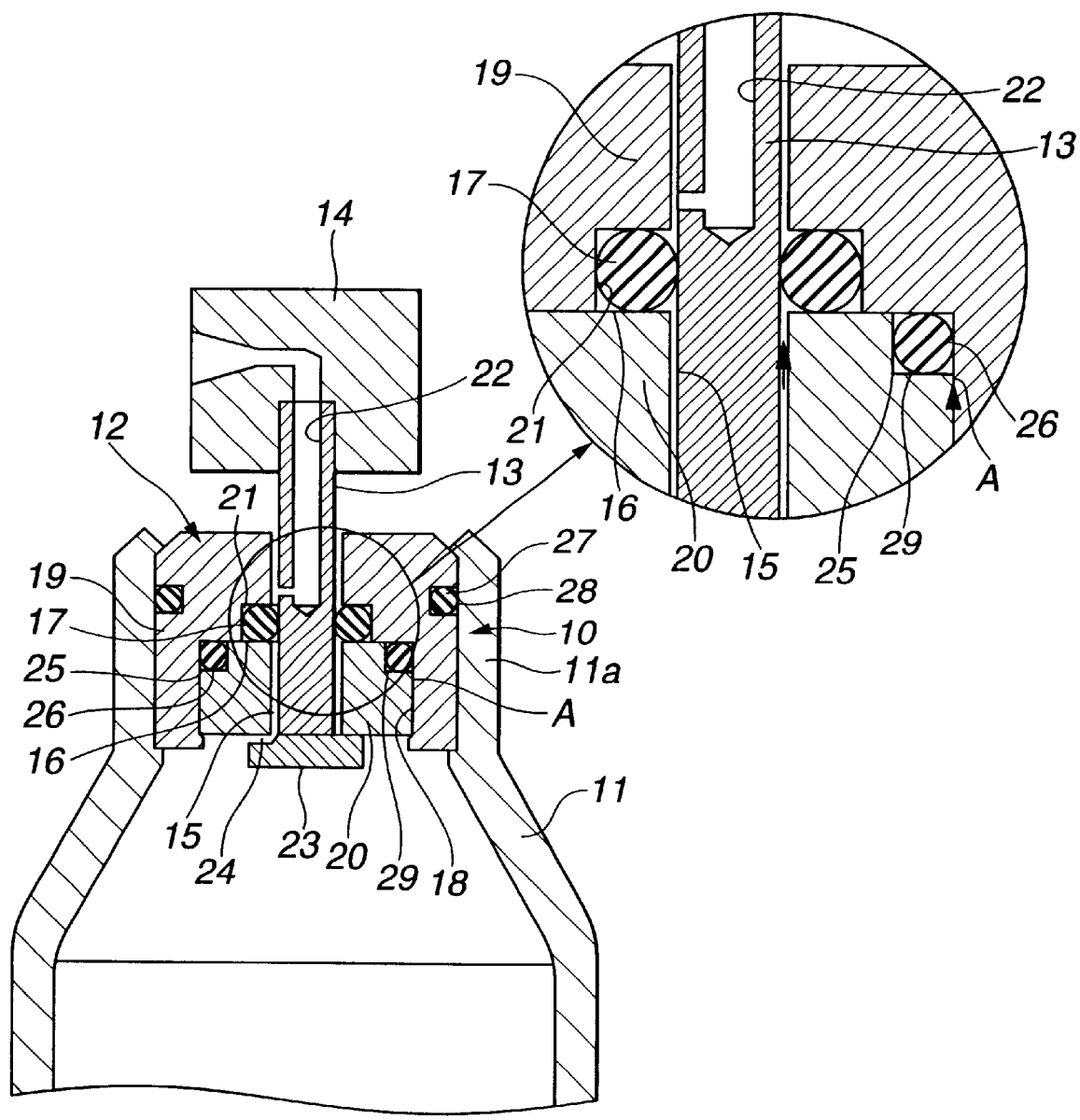
FIG. 1 is a sectional view, with partial enlargement, showing a first embodiment of a gas ejection valve according to the present invention.

Referring to the drawings wherein like reference numerals designate like parts throughout the views, a gas ejection valve embodying the present invention will be described.

Referring to FIG. 1, there is shown an ejection apparatus to which the present invention is applied. The ejection apparatus comprises a gas ejection valve 10 hermetically mounted to a gas container 11 filled with high-pressure gas such as liquefied $CO_2$ gas and contents such as chemical agent.

The gas ejection valve 10 comprises a valve casing 12 secured to an opening 11a of the gas container 11, and a valve pin 13 slidably held by the valve casing 12. A nozzle button 14 with both nozzle function and, push-button function is secured to an end of the valve pin 13 that protrudes upward from the valve casing 12.

A guide hole 15 is axially formed through the center of the valve casing 12 to receive the valve pin 13. A C-shaped section holder groove 16 is formed in the substantially center position of the guide hole 15 as viewed axially to open in the direction of the axis of the guide hole 15. Received in the holder groove 16 is an inner peripheral seal ring 17 having circular section and formed out of a resilient member.

The valve casing 12 comprises a first block 19, or block directly secured to the opening 11a of the gas container 11 by caulking and has a concave surface 18 formed on the side of the lower surface that faces the inside of the gas container 11, and a second block 20, or block placed on the inner peripheral side of the gas container 11, which is axially engaged with the concave surface 18 of the first block 19. An annular recess 21 is formed in the center of a bottom wall of the concave surface 18 of the first block 19 to face the guide hole 15. The recess 21 has an L-shaped section, and defines a bottom wall and one side wall of the holder groove 16. The inner periphery of the upper surface of the second block 20 is formed flat to define another side wall of the holder groove 16.

The valve pin 13 has a gas hole or passage 22 formed at the end protruding upward from the valve casing 12 to ensure communication between an end face and an outer peripheral face of the valve pin 13 a predetermined distance away from the end face. When the valve pin 13 is in the upward position, an end of the gas passage 22 at the outer peripheral face of the valve pin 13 is opened above the inner peripheral seal ring 17, i.e. close to the outside of the gas container 11, whereas when the valve pin 13 is pushed down from the outside, it is opened below the inner peripheral seal ring 17, i.e. close to the inside of the gas container 11.

A stopper flange 23 is integrated with a lower end of the valve pin 13 positioned inside the gas container 11. The stopper flange 23 abuts on the lower surface of the valve casing 12, specifically, the second block, to restrict upward displacement of the valve pin 13. A groove 24 is radially formed in the upper surface of the stopper flange 23 to ensure continuous communication between the inside of the guide hole 15 and that of the gas container 11 even when the flange 23 abuts on the lower surface of the valve casing 12.

The gas ejection valve 10 is configured such that the holder groove 16 for receiving the inner peripheral seal ring 17 is defined by the first and second blocks 19, 20 as described above. Thus, a mating face A of the first and second blocks 19, 20 continuously extends from the bottom of the holder groove 16 to the inside of the gas container 11. An annular space 25 is formed in the middle of the mating face A to roughly be concentric with the holder groove 16, in which an auxiliary seal ring 26 having circular section and formed out of resilient member is received. Specifically, in the illustrative embodiment, an L-shaped section annular recess 29 is formed at an outer peripheral corner of the upper surface of the second block 20, which cooperates with the concave surface 18 of the first block 19 to form the annular space 25.

The annular space 25 formed in such a way has a rectangular section. When the annular space 25 receives the circular section auxiliary seal ring 26, the ring 26 comes in close contact with four walls of the space 25. Likewise, the inner peripheral seal ring 17 received in the holder groove 16 comes in close contact with four faces or points with respect to three walls of the holder grooves 16 and a peripheral wall of the valve pin 13.

An annular groove 27 is formed in the outer peripheral face of the first block 19 of the valve casing 12, in which an outer peripheral seal ring 28 of a resilient member is received to ensure sealing between the first block 19 and the opening 11a of the gas container 11.

The gas ejection valve 10 is configured as described above, so that while the nozzle button 14 is not pushed down, the valve pin 13 is biased by the gas pressure within the gas container 11 to occupy the uppermost position, having the lower end of the gas passage 22 positioned above the inner peripheral seal ring 17. Thus, the gas passage 22 is not in communication with the inside of the gas container 11.

In this state, when pushing the nozzle button 14 down, the valve pin 13 is moved downward to have the lower end of the gas passage 22 positioned below the inner peripheral seal ring 17, ejecting gas and contents in the gas container 112 outside through the gas passage 22 and a hole of the nozzle button 14.

With the gas ejection valve 10, leakage of gas through the guide hole 15 during nonuse of the apparatus for preservation, etc. is prevented by the inner peripheral seal ring 17 that comes in close contact with the outer peripheral face of the valve pin 13. The inner peripheral seal ring 17 undergoes only the gas pressure within the gas container 11 along the valve pin 13, and no gas pressure through the mating face A of the first and second blocks 19, 20. That is, the gas pressure within the gas container 11 that may come into the holder groove 16 of the inner peripheral seal ring 17 through the mating face A of the first and second blocks 19, 20 is surely blocked by the auxiliary seal ring 26 received in the annular space 25.

Therefore, the gas ejection valve 10 has no great deformation of the inner peripheral seal ring 17 caused by the gas pressures resulting from a plurality of paths, achieving a sure reduction in leakage of gas during nonuse of the apparatus compared with typical gas ejection valves with no inventive structure provided.

Moreover, with the gas ejection valve 10, the L-shaped section annular recess 29 is formed at the outer peripheral corner of the second block 20 engaged with the concave surface 18 of the first block 19 so as to define the annular space 25, resulting in its easier machining than machining of an annular groove in a single block, allowing manufacturing of the gas ejection valve at low cost.

In the first embodiment, in order to obtain the holder groove 16, the annular recess 21 is formed at the inner peripheral edge of the lower surface of the first block 19 positioned at the outer periphery of the gas container 11. Optionally, the recess 21 may be formed at an inner peripheral edge of the upper surface of the second block 20. In the alternative, the inner peripheral edge of the lower surface of the first block 19 is not cut but formed flat.

Figure 2:
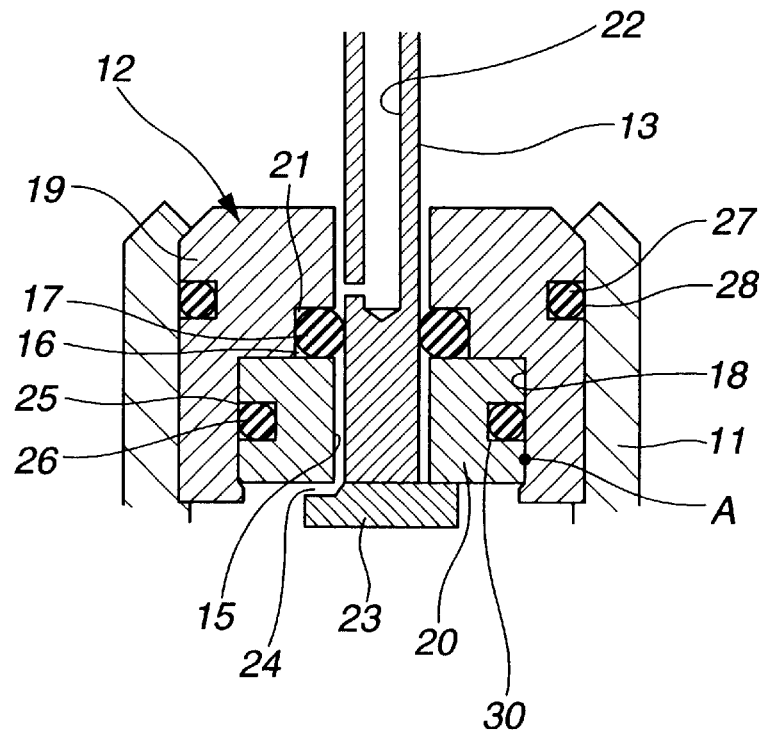
FIG. 2 is a view similar to FIG. 1, showing a second embodiment of the present invention.
Figure 3:
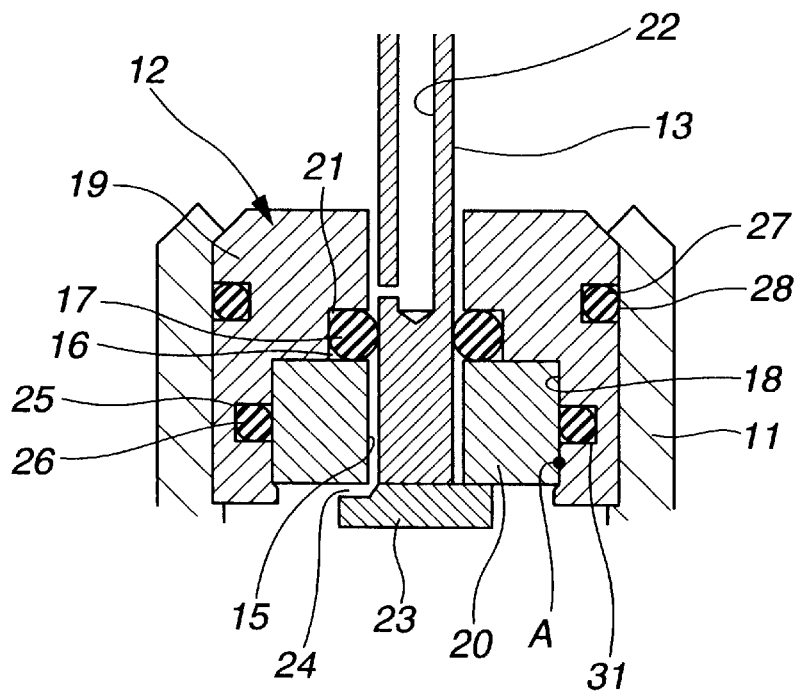
FIG. 3 is a view similar to FIG. 2, showing a third embodiment of the present invention.

Moreover, in the first embodiment, the annular space 25 is defined by forming the annular recess 29 at the outer peripheral corner of the second block 20. Optionally, referring to FIGS. 2–3 each illustrating second and third embodiments, an alternative solution may be adopted, such as defining an annular space 30 in the outer peripheral face of the second block 20 as shown in FIG. 2, or defining an annular space 31 in the inner peripheral face of the concave 18 of the first block 19 as shown in FIG. 3. If the annular space 31 is defined in the first block 19 having the annular recess 21 for the holder groove 16 as illustrated in FIG. 3, machining only needs to carry out with respect to a single block or the first block 19, which results in no need of a change of machining chucks, enabling easy manufacturing of the valve.

Figure 4:
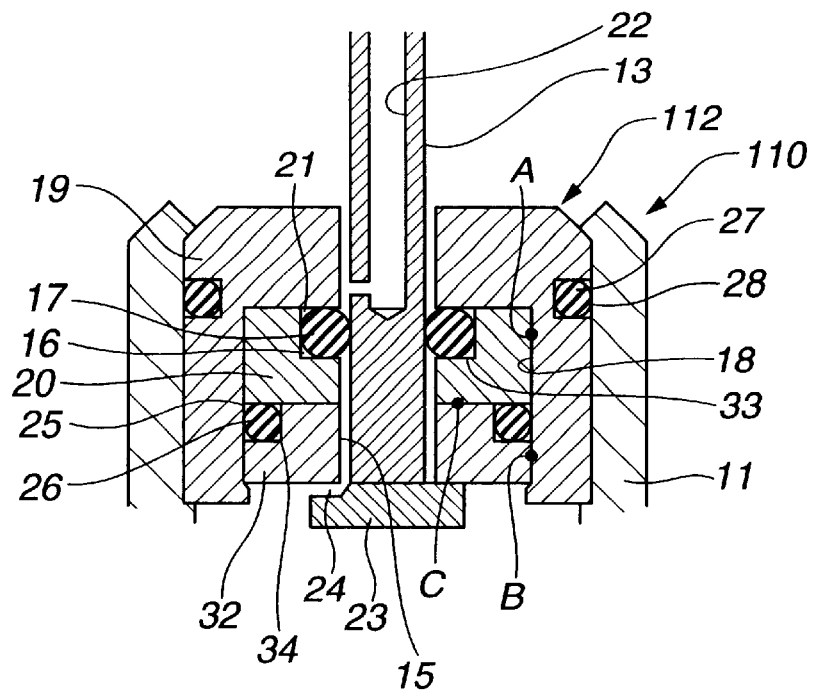
FIG. 4 is a view similar to FIG. 3, showing a fourth embodiment of the present invention.

Referring to FIG. 4, there is shown a fourth embodiment of the present invention wherein a gas ejection valve 110 has substantially the same structure as that of the first embodiment shown in FIG. 1 except a valve casing 112.

The valve casing 112 of the gas ejection valve 110 comprises, in addition to the first and second blocks 19, 20, a third block 32 with the same diameter as that of the second block 20. The third block 32, which is disposed adjacent to the inner surface of the second block 20 close to the inside of the gas container 11, is axially engaged, together with the second block 20, with the concave surface 18 of the first block 19.

The lower surface of the first block 19 in the concave surface 18 is formed flat. An L-shaped section annular recess 33 is formed at an inner peripheral edge of the upper surface of the second block 20. The lower surface of the first block 19 and the annular recess 33 of the second block 20 cooperate to define the holder groove 16 for receiving the inner peripheral seal ring 17.

An L-shaped section annular recess 34 is formed at an outer peripheral corner of the upper surface of the third block 32. Two faces of the annular recess 32, the lower surface of the second block 20, and the inner peripheral face of the concave surface 18 of the first block 19 cooperate to define the annular space 25 for receiving the auxiliary seal ring 26. The auxiliary seal ring 26 has a circular section, and comes in close contact with four faces, i.e. the two faces of the annular recess 34, the lower surface of the second block 20, and the inner peripheral face of the concave surface 18. That is, the annular space 25 is arranged in a portion defined by the mating face A of the first and second blocks 19, 20, a mating face B of the first and third blocks 19, 32, and a mating face C of the second and third blocks 20, 32. The two mating faces B, C defined by the third block 32 are sealed by the single auxiliary seal ring 26.

With the gas ejection valve 110, the mating face A of the first and second blocks 19, 20 is not sealed directly, whereas the two mating faces B, C of the third block 32 connecting the mating face A of the first and second blocks 19, 20 are sealed by the auxiliary seal ring 26, so that the gas pressure within the gas container 11 does not act on the bottom of the holder groove 16 for receiving the inner peripheral seal ring 17 through the mating face A. Therefore, with the gas ejection valve 110 also, leakage of gas through the guide hole 15 can be reduced in a sure way.

In a variant of the fourth embodiment, annular grooves may be formed in the respective mating faces B, C of the third block 32 to receive respective auxiliary seal rings 26. However, the structure as shown in FIG. 4 wherein the annular recess 34 is formed at the outer peripheral corner of the upper surface of the third block 32 to receive the auxiliary seal ring 26 allows a reduction not only in number of auxiliary seal rings 26, but in number of processes for machining the annular space 25.

Figure 5:
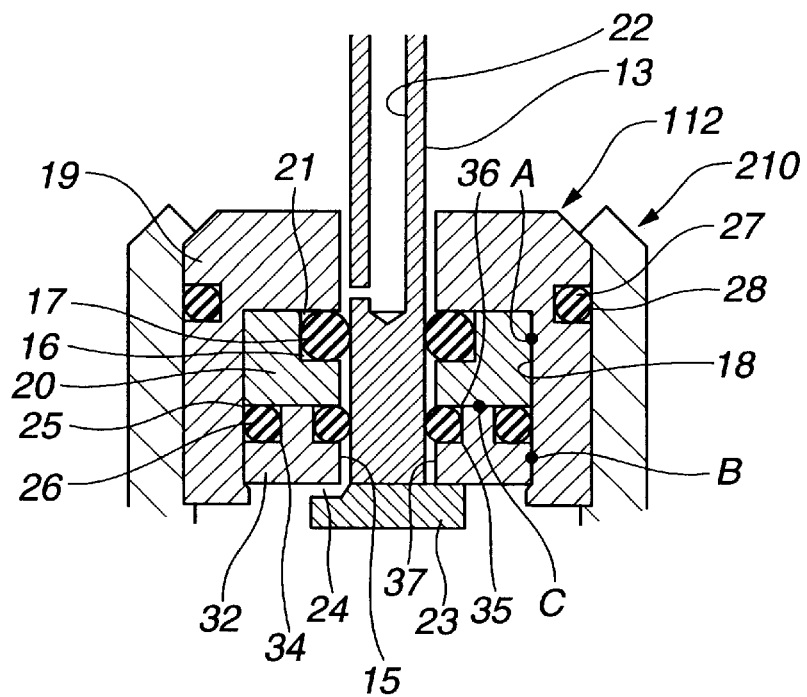
FIG. 5 is a view similar to FIG. 4, showing a fifth embodiment of the present invention.

Referring to FIG. 5, there is shown a fifth embodiment of the present invention wherein a gas ejection valve 210 is substantially the same in structure as the gas ejection valve 110 in the fourth embodiment except that an L-shaped section annular recess 35 is additionally formed at an inner peripheral corner of the upper surface of the third block 32, which defines an annular space 36 together with the lower surface of the second block 20 and the valve pin 13 to receive a second auxiliary seal ring 37.

The effect of the fifth embodiment is fundamentally similar to that of the fourth embodiment as illustrated in FIG. 4. Additional effect of the fifth embodiment is that since the second auxiliary seal ring 37 ensures both sealing of the mating face C of the upper surface of the third block 32 and sealing of the outer peripheral face of the valve pin 13, leakage of gas through the mating faces C, A and leakage of gas along the outer peripheral face of the valve pin 13 can be prevented in a double way.

Having described the present invention with regard to the illustrative embodiments, it is understood that the present invention is not limited thereto, and various changes and modifications can be made without departing from the scope of the present invention. By way of example, the stopper flange 23 and the valve pin 13 may be formed out of a single workpiece, e.g. by machining.

The entire teachings of Japanese Patent Application 11-358661 are incorporated hereby by reference.

What is claimed is:

1. A valve for a gas ejection apparatus with a container, comprising:
    a casing secured to an opening of the container, the casing comprising a first block and a second block, the first block and the second block being axially placed contiguously to define a first mating face therebetween;
    the casing having an axial opening that defines a guide hole;
    a pin movably received in the guide hole of the casing, the pin having a passage;
    a first groove formed between the first block and the second block to face the guide hole;
    a first seal ring disposed in the first groove,
    wherein when the pin is pushed down, the passage is adapted to ensure fluid communication between an outside of the container and an inside of the container, and when the pin is not pushed down, the first seal ring prevents communication between the outside of the container and the inside of the container;
    the first mating face having a space formed thereon; and
    a second seal ring received in the space, the second seal ring preventing fluid communication between the inside of the container and the first groove.

2. The valve as claimed in claim 1, wherein the first block of the casing is placed on the opening of the container, and having a concave surface, the concave surface being placed on an inner peripheral side of the container, and the second block of the casing being engaged with the concave surface of the first block in an axial direction of the container.

3. The valve as claimed in claim 2, wherein the first block defines a top wall and one side wall of the first groove, and the second block defines a bottom wall of the first groove.

4. The valve as claimed in claim 3, wherein the second block is formed with a recess at an outer peripheral corner of a surface disposed inside of the concave surface of the first block, wherein the concave surface of the first block and the recess cooperate to define the space for receiving the second seal ring.

5. The valve as claimed in claim 1, wherein the first block is formed with a second groove in an inner peripheral face to define the space for receiving the second seal ring.

6. The valve as claimed in claim 1, wherein the second block is formed with a third groove in an outer peripheral face to define the space for receiving the second seal ring.

7. The valve as claimed in claim 6, wherein the second block comprises a first portion and a second portion that define the third groove therebetween, the first portion being disposed more distant from the inside of the container than the second portion.

8. The valve as claimed in claim 7, wherein the first block and the second portion define a second mating face therebetween, the first portion and the second portion define a third mating face therebetween, the space for receiving the second seal ring is formed at an intersection between the second mating face and the third mating face.

9. The valve as claimed in claim 8, further comprising a third seal ring received in another space formed at an inner periphery of the second block and in the third mating face of the first and second portions of the second block.

10. An apparatus for ejecting gas, comprising:
    a container with an imaginary axis; and
    a valve hermetically mounted to the container, the valve comprising:
        a casing secured to an opening of the container, the casing comprising a first block and a second block, the first block and the second block being axially placed contiguously to define a first mating face therebetween;
        the casing having an axial opening that defines a guide hole;
        a pin movably received in the guide hole of the casing, the pin having a passage;
        a first groove formed between the first block and the second block to face the guide hole;
        a first seal ring disposed in the first groove,
        wherein when the pin is pushed down, the passage is adapted to ensure fluid communication between an outside of the container and an inside of the container, and when the pin is not pushed down, the first seal ring prevents communication between the outside of the container and the inside of the container;
        the first mating face having a space formed thereon; and
        a second seal ring received in the space, the second seal ring preventing fluid communication between the inside of the container and the first groove.

11. The apparatus as claimed claim 10, wherein the first block of the casing is placed on the opening of the container, and having a concave surface, the concave surface is placed on an inner peripheral side of the container, and the second block of the casing is engaged with the concave surface of the first block in an axial direction of the container.

12. The apparatus as claimed in claim 11, wherein the first block defines a top wall and one side wall of the first groove, and the second block defines a bottom wall of the first groove.

13. The apparatus as claimed in claim 12, wherein the second block is formed with a recess at an outer peripheral corner of a surface disposed inside of the concave surface of the first block, wherein the concave surface of the first block and the recess cooperate to define the space for receiving the second seal ring.

14. The apparatus as claimed in claim 10, wherein the first block is formed with a second groove in an inner peripheral face to define the space for receiving the second seal ring.

15. The apparatus as claimed in claim 10, wherein the second block is formed with a third groove in an outer peripheral face to define the space for receiving the second seal ring.

16. The apparatus as claimed in claim 15, wherein the second block comprises first and second portions to define the third groove therebetween, the first portion being disposed more distant from the inside of the container than the second portion.

17. The apparatus as claimed in claim 16, wherein the space for receiving the second seal ring is formed in a second mating face of the first block and the second portion of the second block and a third mating face of the first and second portions of the second block.

18. The apparatus as claimed in claim 17, further comprising a third seal ring received in another space formed at an inner periphery of the second block and in the third mating face of the first and second portions of the second block.

19. A valve for a gas ejection apparatus with a container, comprising:

a casing secured to an opening of the container, the casing comprising a first block, a second block and a third block, the first block having a concave surface, the concave surface is placed on an inner peripheral surface of the first block, and the second block of the casing is engaged with the concave surface of the first block in an axial direction of the container to define a first mating face therebetween, the third block is engaged with the concave surface of the first block in axial direction of the container to define a second mating face therebetween, the second block and the third block being axially placed contiguously to define a third mating face therebetween;

the casing having an axial opening that defines a guide hole;

a pin movably received in the guide hole of the casing, the pin having a passage;

a first groove formed between the first block and the second block to face the guide hole;

a first seal ring disposed in the first groove, wherein when the pin is pushed down, the passage is adapted to ensure fluid communication between an outside of the container and an inside of the container, and when the pin is not pushed down, the first seal ring prevents communication between the outside of the container and the inside of the container;

the third mating face having a space formed thereon to face the first mating face or the second mating face; and a second seal ring received in the space, the second seal ring preventing fluid communication between the inside of the container and the first groove.

20. The valve as claimed in claim 19, wherein the first block of the casing is placed on the opening of the container and is formed with a concave surface, and the second and third blocks of the casing are placed on an inner peripheral side of the container and are engaged with the concave surface of the first block in an axial direction of the container, wherein the second block is disposed more distant from the inside of the container than the third block.

* * * * *